March 31, 1959 W. C. JAKES, JR 2,880,310

MICROWAVE PASSIVE REPEATERS

Filed Dec. 31, 1953 5 Sheets-Sheet 1

INVENTOR
W. C. JAKES, JR.
BY Hugh S. Wertz
ATTORNEY

MICROWAVE PASSIVE REPEATERS

Filed Dec. 31, 1953 5 Sheets-Sheet 2

INVENTOR
W. C. JAKES, JR.
BY Hugh S. Wertz
ATTORNEY $$\frac{2h}{X} = \frac{1+\cos\alpha + \sin\alpha \tan\theta_1}{\sin(2\theta-\alpha)}$$

INVENTOR
W. C. JAKES, JR.
BY Hugh S. Wertz
ATTORNEY

MICROWAVE PASSIVE REPEATERS

Filed Dec. 31, 1953 5 Sheets-Sheet 4

INVENTOR
W. C. JAKES, JR.
BY Hugh S. Wertz
ATTORNEY

INVENTOR
W. C. JAKES, JR.
BY Hugh S. Wertz
ATTORNEY

United States Patent Office 2,880,310

Patented Mar. 31, 1959

2,880,310

MICROWAVE PASSIVE REPEATERS

William C. Jakes, Jr., Red Bank, N.J., assignor to Bell Telephone Laboratories, Incorporated, New York, N.Y., a corporation of New York Application December 31, 1953, Serial No. 401,652

1 Claim. (Cl. 250—15)

This invention relates to microwave radio relay transmission systems, and, more particularly, to microwave repeaters for use in such transmission systems.

In microwave radio relay systems, due to the propagation characteristics of the high frequency waves involved, it is necessary to locate the system components, namely, the transmitters, repeaters, and receivers, along line-of-sight paths in order to insure low-loss transmission. As frequently occurs, due to terrain characteristics in many locales, the normal line of sight location for one or more of the system components is in a virtually inaccessible place, resulting in abnormally expensive installation and maintenance costs. To obviate this difficulty, a genus of repeaters has been created which operates upon principles of wave reflection. Such repeaters, of the type shown and described in United States Patent 1,939,345, F. Gerth et al., December 12, 1933, are known as "passive" repeaters inasmuch as they do not require power to perform their operations. Once they have been properly installed, these repeaters require practically no maintenance and have been found in practice to be remarkably efficient in operation. The present invention, in one of its more important aspects, relates to the improvement in this type of passive repeater.

The use of passive repeaters has quite often been restricted due to the difficulty of locating the receiver equipment in an easily accessible place which is favorably located with respect to a proper site for the passive repeater. One important consideration has been the transfer angle involved, which is here defined as the angle through which the transmitted beam, or beam incident upon the repeater must be rotated in order to be directed upon a line of sight path to the next repeater, or receiver, as the case may be. In the case where a plane mirror is used as the passive repeater, the area of the mirror is inversely proportional to the size of the transfer angle inasmuch as the effective area of the mirror is the projection of the mirror in a plane normal to the incident or reflected ray. Thus, in those cases where conveniened of location dictates a small transfer angle, the actual mirror size is necessarily quite large, resulting in increased expense, greater difficulty of installation, and more inefficient operation due to the increased effect of wind and weather on the mirror.

It is an object of this invention to provide a passive repeater, the area of which may be made small for small values of transfer angle.

A major deterrent to achieving efficient line of sight propagation of microwaves over long distances has been the phenomenon of bending of the radio beam. This bending is, in general, attributable to variations in the refractive index of the earth's atmosphere. The effect of this bending in a microwave radio relay system is to change the angle of arrival of the beam incident on the repeater or receiver. In the case of a passive repeater, this change in the angle of incidence can result in greatly increased loss of signal, especially where the repeater is at great distance from both the transmitter and receiver, or next repeater.

It is, therefore, a further object of this invention to provide a passive repeater which will minimize signal losses due to anomalous bending of the beam.

These and other objects and advantages, as well as the nature of the present invention will become more fully apparent upon consideration of the various illustrative embodiments described in detail in the following description, to be read in conjunction with the drawings, in which.

Figure 6A:
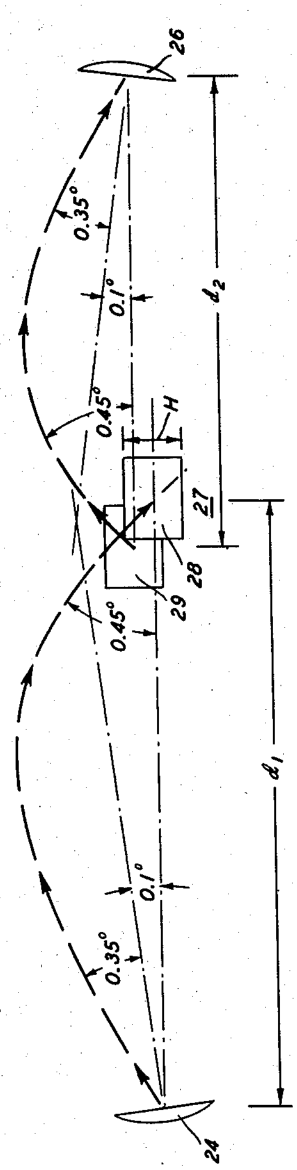
Fig. 6A is a diagrammatic elevation view of a system embodying the present invention, showing typical beam deviation in the vertical plane.
Figure 6B:
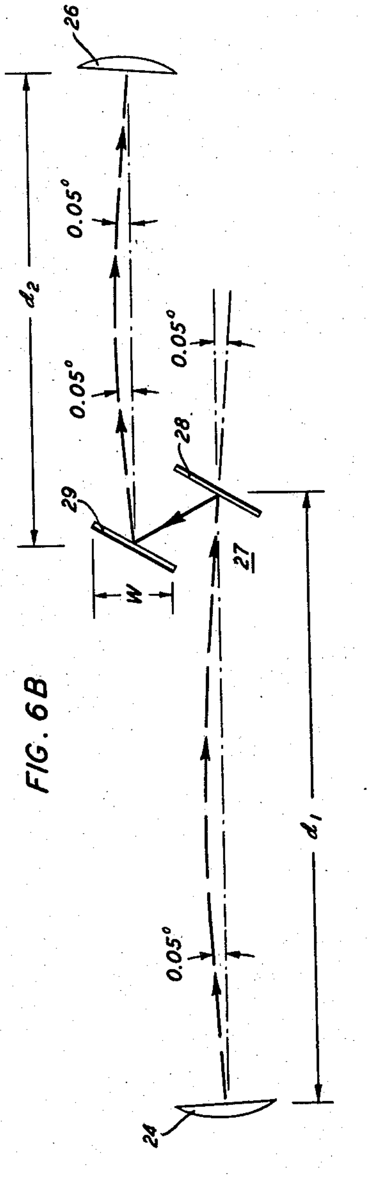
Fig. 6B is a diagrammatic plan view of a system embodying the present invention, showing beam deviation in the horizontal plane.
Figure 7A:
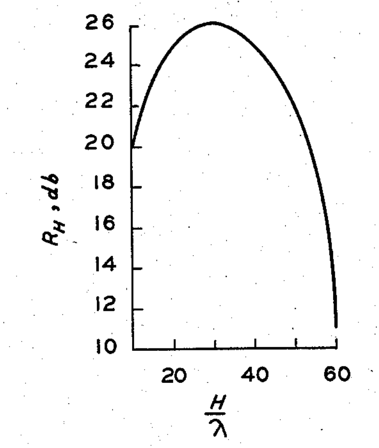
Figure 7B:
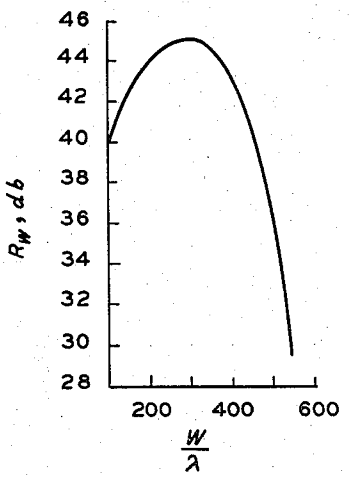
Figure 8:
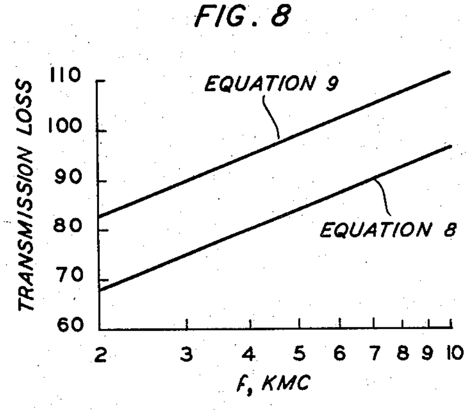
Figure 7C:
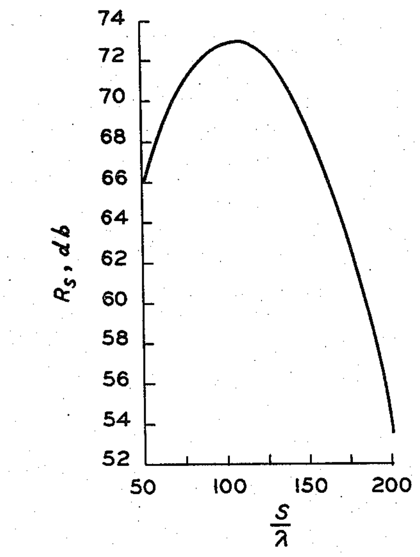
Figure 9:
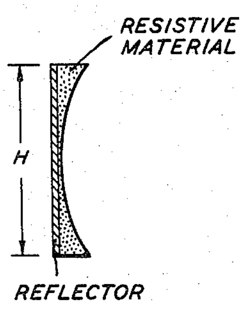

Figs. 7A, 7B, and 7C are curves showing the results of an analysis of beam "bending" in Figs. 6A and 6B;

Fig. 8 is a graph showing further results of beam "bending" in Figs. 6A and 6B; and Fig. 9 shows one modification of a repeater mirror to overcome losses due to beam "bending."

In accomplishing the objects of this invention, the large single mirror of the known types of passive repeaters is replaced by two mirrors, so closely situated to each other that the microwave beam between them is, for all practical purposes, collimated. That is, while a microwave beam from a point source is conical, the spacing between the mirrors is so small relative to their sizes that the conical expansion of the beam and loss due to diffraction effects are negligible between the mirrors. This arrangement of the mirrors permits great flexibility so that practically any location becomes suitable as a site for the repeater.

Figure 1:
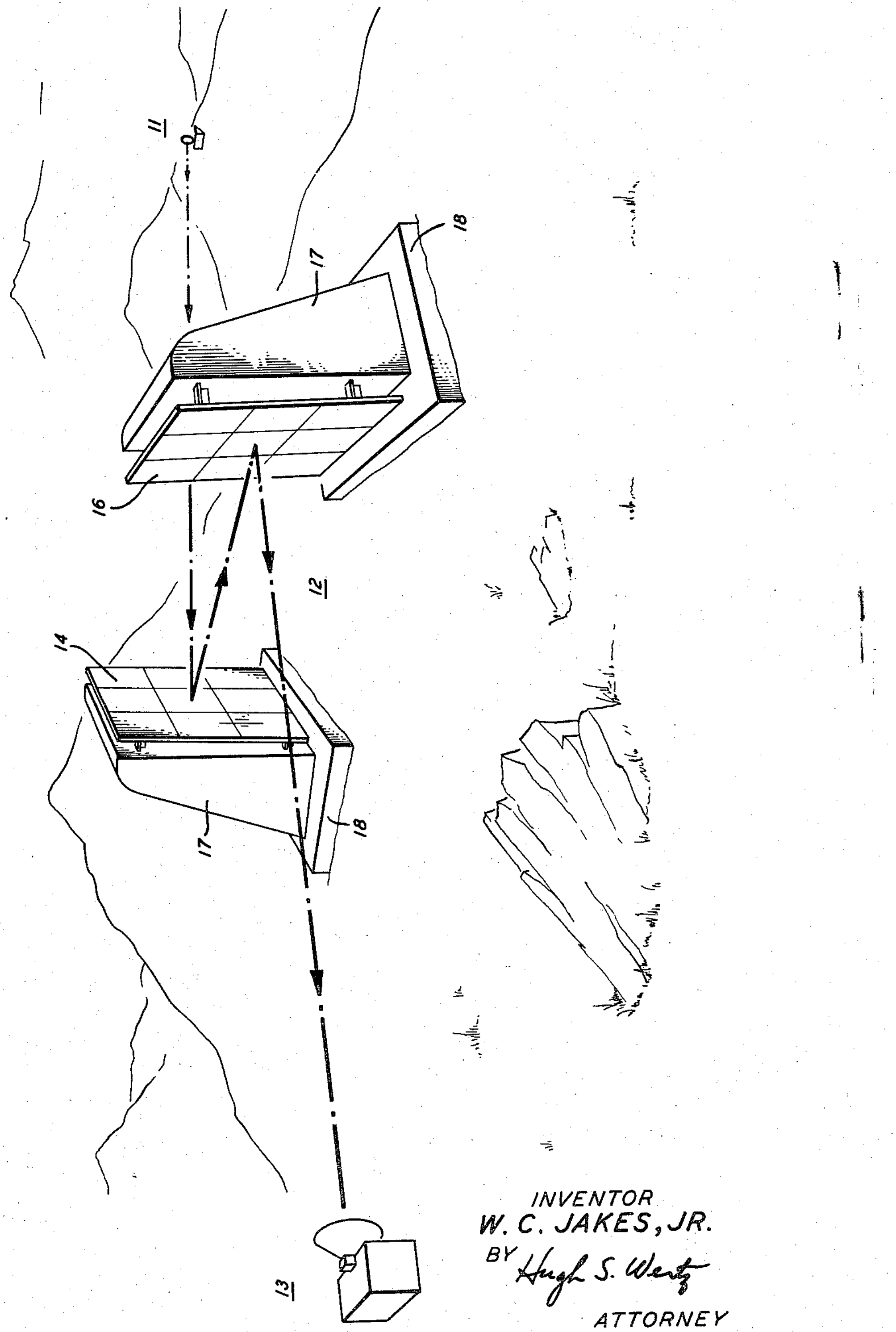
Fig. 1 is a perspective view of the principal embodiment of the invention, showing a transmitter, a receiver, and a passive repeater located therebetween.

Turning now to the drawings, there is shown in Fig. 1 a microwave radio relay link having a transmitter 11, a passive repeater 12, and a receiver 13. Transmitter 11 and receiver 13 may be of any well-known type commonly used in long distance microwave communication which is capable of transmitting and receiving a microwave beam. Repeater 12 comprises a first plane mirror 14 for receiving the transmitted beam from the transmitter 11 and reflecting it to a second plane mirror 16, which in turn reflects the beam toward receiver 13. The mirrors 14 and 16 may be of any suitable material which gives low loss reflection of the microwave beam. In the embodiment shown in Fig. 1, the mirrors are made of ten-foot square flat sections of conductive material. It is essential to efficient performance of the mirrors that they be rigidly mounted. To this end, suitably rigid braced supports 17 mounted on concrete blocks 18 are used to support the mirrors. It is to be understood that any type of support which affords the necessary rigidity might be used, that shown here being merely by way of example. In locales where there are prevailing winds, it might be feasible to perforate the mirror surfaces with numerous "pin-holes" to minimize the effect of the wind.

*Theoretical discussion*

The transmission loss between two antennae is given by the formula $$\frac{P_T}{P_R}=\frac{\lambda^2 d^2}{A_1 A_2}=\text{transmission loss} \quad (1)$$

where:

$P_T$=power transmitted
$P_R$=power received
$A_1A_2$=effective areas of the two antennae
$\lambda$=free space wavelength
$d$=separation between antennae (path length).

Figure 2:
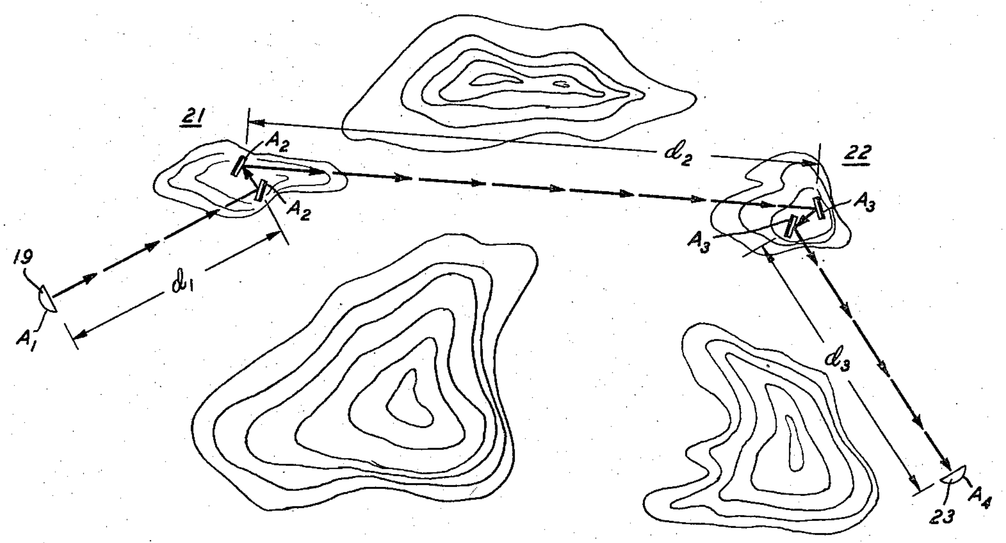
Fig. 2 is a plan view of a typical microwave radio relay link using two passive repeaters of the type embodying the present invention, showing how undesirable terrain characteristics are overcome.

This formula is accurate generally for cases where $d$ is of a magnitude sufficient to give a loss of eight decibels or more. Inasmuch as the values of $d$ contemplated in this invention are equal to or greater than this magnitude, Formula 1 is sufficiently accurate for purposes of this analysis. In Fig. 2 is shown a typical installation having a transmitting antenna 19 which has an effective area $A_1$, a first passive repeater 21 having an effective or projected area in both directions $A_2$ and separated from the transmitting antenna by a distance $d_1$, a second passive repeater 22 having an effective or projected area in both directions $A_3$ and separated from the repeater 21 by a distance $d_2$, and a receiving antenna 23 having an effective area $A_4$ and separated from the repeater 22 by a distance $d_3$. The transmission loss over the arrangement of Fig. 2 becomes $$\frac{P_T}{P_R}\frac{(\lambda^3 d_1 d_2 d_3)^2}{A_1 A_2^2 A_3^2 A_4} \quad (2)$$

Figure 3:
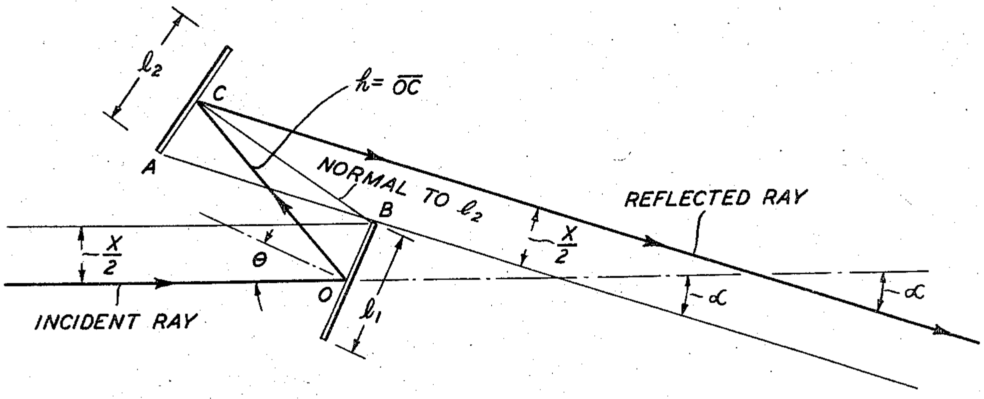
Fig. 3 is a diagrammatic view of the passive repeater of the present invention in its simplest form, showing the more important dimensions which are to be considered.

It will be seen in Formula 2 that the transmission losses may be minimized by making the projected areas $A_2$ and $A_3$ large. There are certain geometrical considerations, however, which lead to repeater designs having the least reflector surface for a given transfer angle or the least separation between mirrors, for installations where space is a prime factor. Referring to Fig. 3, wherein is shown a passive repeater embodying the present invention, the following qualities are necessary to consider:

$x$=the projected length of each mirror (taken to be equal)
$\alpha$=the transfer angle
$l_1$, $l_2$=the actual length of each mirror
$\theta$=the angle of incidence at the first mirror
$h$=the mirror separation, measured between their centers
$L$=the length of a single mirror repeater equivalent to a double mirror system.

Figure 4A:
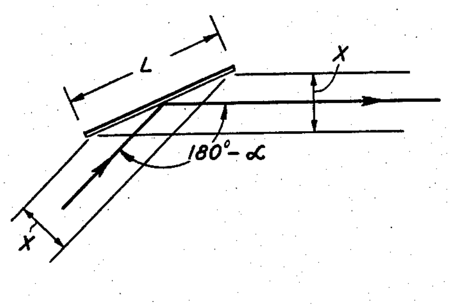
Fig. 4A is a diagrammatic view of a single mirror passive repeater of a type well known in the art.
Figure 4B:
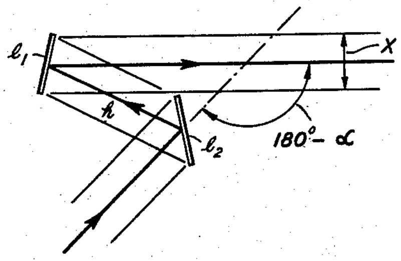
Fig. 4B is a diagrammatic view of a passive repeater embodying the present invention.
Figure 4C:
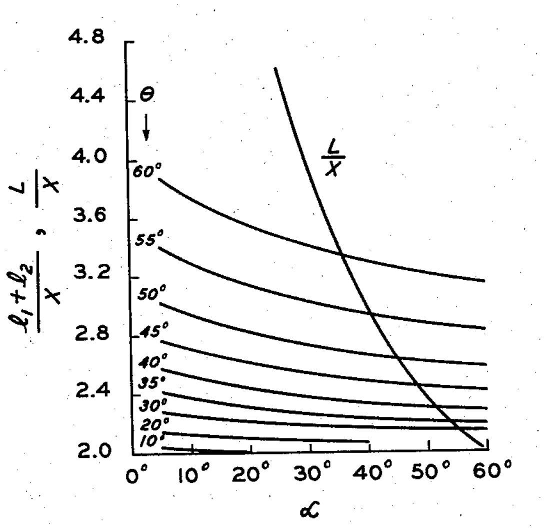
Fig. 4C is a graph of length versus transfer angle for the repeaters of 4A and 4B.

Assuming, for purposes of analysis, that the transfer angle $\alpha$ and the desired project length $x$ are given, then the variations of $l_1+l_2$ and $h$ with $\theta$ are studied, the design here chosen being such that the mirrors are as close together as possible, that is, the line AB in Fig. 3 makes an angle $\alpha$ with the incident ray. Fig. 4C shows the variation of total mirror length, $l_1+l_2$ with $\theta$ for the repeater of Figs. 3 or 4B, together with the length L of the single mirror of Fig. 4A for comparison. An inspection of the curves of Fig. 4C reveals that there are certain values of the angle $\theta$ which, for a given value of the angle $\alpha$, result in a total length, $l_1+l_2$, of the double mirror arrangement which is less than the length L of a single mirror. For example, if $\alpha$ is 35°, $l_1+l_2$ is less than L for all values of $\theta$ from 0° to 60°. This decrease in the required length results in not only a saving in cost of materials and construction, but also reduces materially the deleterious effects of wind and weather.

Figure 5:
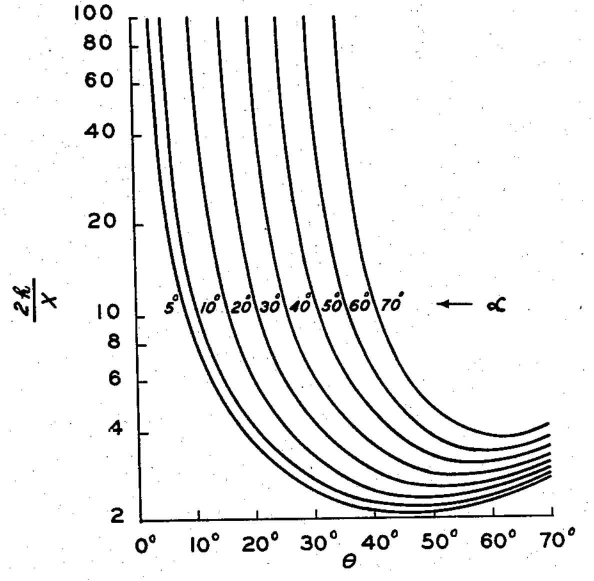
Fig. 5 is a graph of the separation of the mirrors of the present invention for different values of beam incidence angle and transfer angle.

Fig. 5 shows the variations in mirror separation for changes in the angles $\alpha$ and $\theta$. It can be seen that for a given $\alpha$ there is a value of $\theta$ for which the mirror separation $h$ is a minimum. Thus, using the values of the previous example, where it was shown that for an $\alpha$ of 35°, $\theta$ could vary between 0° and 60°, Fig. 5 shows that a $\theta$ of approximately 52° will give the minimum spacing $h$. The minimum spacing results in a decrease in the necessary size of the repeater site, which permits a greater freedom in choosing an adequate site.

As is frequently the case in microwave radio relay transmission, anomalous tropospheric bending may occur at certain times, resulting in increases in signal losses over the normal losses. This phenomenon places certain limitations on the maximum size of passive repeaters. In Figs. 6A and 6B there are shown a transmitting antenna 24, a receiving antenna 26, and a double mirror passive repeater 27, having a first mirror 28 and a second mirror 29. A distance $d_1$ separates antenna 24 from repeater 27, and a distance $d_2$ separates repeater 27 from antenna 26. In order to facilitate a study of anomalous bending and its effect on repeater size, $d_1$ and $d_2$ are each taken as equal to thirty miles. This distance represents the nearly maximum line of sight distance obtainable, and there is ample data available on the bending phenomenon over this distance. The data here used was taken from "Measurement of the Angle of Arrival of Microwaves" by W. M. Sharpless, Proceedings of I.R.E., November 1946, page 837, and "Further Observations of the Angle of Arrival of Microwaves" by A. B. Crawford and W. M. Sharpless, Proceedings of I.R.E., November 1946, page 845. In those articles, the maximum vertical angle-of-arrival deviation for a direct ray was found to be approximately +0.45° over a thirty-mile path. Deviation in the horizontal angle-of-arrival is here taken as ±0.05°, which, while not the maximum deviation observed, is sufficiently realistic for this analysis. It is further assumed that the bending is symmetrical at both ends of the thirty-mile path, which represents the worst case. Thus, Figs. 6A and 6B represent the worst case of ray bending in the vertical and horizontal planes respectively which it is feasible to consider. Antennae 24 and 26 are each oriented 0.1° above the line of sight path, as best seen in Fig. 6A, since the bending seems to be more frequent for positive angles.

In order to calculate the effect of bending on system performance, the radiation patterns of the various elements of the system must be known. Each antenna, which, in the example here shown, is a paraboloid, when considered as a transmitter, produces a maximum field intensity at $\Theta=0$, where $\Theta$ is the angle measured from the paraboloid axis, i.e., normal to the aperture. For purposes of analysis, this value of field intensity is taken as one. The radiation pattern of the transmitting antenna 24 and receiving antenna 26 is then written $P(\Theta)$, where $P(\Theta=0)=1$. It is assumed that the radiation pattern has circular symmetry. The radiation pattern of the repeater 27 is defined in a similar way and is written as $M(\Theta)$ where $M(\Theta=0)=1$. $M_v(\Theta)$ will refer to the vertical plane pattern, and $M_h(\Theta)$ to the horizontal plane pattern. Considering first the transmission between antenna 24 and repeater 27 over the distance $d_1$, we assume the "worst bending" condition, that is, the signal leaves antenna 24 and arrives at repeater 27 at an angle of 0.45° up from the horizontal, and deviates 0.05° in the horizontal plane. If $P_1$ is the power radiated and $P_2$ is the power arriving at the repeater, the transmission loss becomes $$\frac{P_1}{P_2}=\frac{\lambda^2 d^2}{0.6\left(\frac{\pi S^2}{4}\right)HW}\,\frac{1}{[P(0.35°)]^2}\,\frac{1}{[P(0.05°)]^2} \quad (3)$$

where H is the height of the repeater, W its projected width, and S is the paraboloid diameter. The factor 0.6 in the denominator of the first term on the right arises from the fact that the effective area of the paraboloid is only sixty percent of its actual area.

Due to the fact that we have a collimated beam between mirrors 28 and 29, and the effective area of a mirror is one hundred percent, $P_2$ will be the power reradiated by the repeater. Inasmuch as the plane wave front of the incident wave was tilted downwards at an angle of 0.45 degree upon arrival at the repeater, and for the worst case, the signal path leaves the repeater at an angle of 0.45 degree up the repeater, vertical radiation pattern factor is calculated for an angle of 0.9 degree. In the same way the horizontal radiation factor must be calculated for an angle of 0.1 degree instead of 0.05 degree. At the receiving paraboloid the situation will be the same as at the transmitting paraboloid. Letting $P_3$ be the power received by the last paraboloid, the transmission loss from the repeater to the receiver is $$\frac{P_2}{P_3}=\frac{\lambda^2 d^2}{0.6\left(\frac{\pi S^2}{4}\right)HW}\frac{1}{[P(0.35°)]^2}\frac{1}{[P(0.05°)]^2}\frac{1}{[M_V(0.9°)]^2}\frac{1}{[M_H(0.1°)]^2} \quad (4)$$

and the total transmission loss, $$\frac{P_1}{P_3}$$

is $$\frac{P_1}{P_3}=\left[\frac{\lambda^2 d^2}{0.6\left(\frac{S^2}{4}\right)HW}\right]^2\frac{1}{[P(0.35°)]^4}\frac{1}{[P(0.05°)]^4}\frac{1}{[M_V(0.9°)]^2}\frac{1}{[M_H(0.1°)]} \quad (5)$$

The total decibel loss is $$L_T=40\log\frac{d}{\lambda}-40\log\left[\frac{S}{\lambda}P(0.05°)P(0.35°)\right]-20\log\left[\frac{H}{\lambda}M_V(0.9°)\right]-20\log\left[\frac{W}{\lambda}M_H(0.1°)\right]+6.6 \quad (6)$$

where $\lambda$ has been divided through so that all lengths may be expressed in wave lengths.

$$\begin{cases} R_S=40\log\left[\frac{S}{\lambda}P(0.05°)P(0.35°)\right] \\ R_H=20\log\left[\frac{H}{\lambda}M_V(0.9°)\right] \\ R_W=20\log\left[\frac{W}{\lambda}M_H(0.1°)\right] \end{cases} \quad (7)$$

Equation 6 then becomes:

$$L_T=40\log\frac{d}{\lambda}+6.6-(R_S+R_H+R_W) \quad (8)$$

The reduction terms $R_s$, $R_H$, and $R_W$ will, in general, be positive numbers and hence will tend to reduce the total loss. Physically they act as follows: as the linear dimension of a radiator is increased the linear factor in the term will increase, since a larger antenna in general has larger gain. On the other hand, the pattern factors will decrease, because as the linear dimension increases, the beam width of the main lobe of the radiation pattern decreases so that a ray leaving at 0.35 degree off the axis will be farther down on the main lobe. This indicates that each reduction term should have a maximum. In Figs. 7A, 7B, and 7C, $R_s$, $R_H$, and $R_W$ have been plotted as a function of size for different field distributions. For the case of the ten decibel square law tapered aperture field of the paraboloid and uniform distribution at the repeater the optimum sizes $$\frac{S}{\lambda}=125\ \frac{H}{\lambda}=30 \text{ and } \frac{W}{\lambda}=300$$

are obtained and $R_s=72.9$ decibels; $R_H=26.1$ decibels and $R_W=45.2$ decibels. When these values are substituted into Equation 8 and $d_1=d_2=30$ miles, the total loss is:

$$L_T=49.9-40\log\lambda,\ \text{db. } (\lambda \text{ in meters.}) \quad (9)$$

This represents the minimum loss obtainable for this case.

Where an anomalous bending is absent the only correction factor needed is the one accounting for the permanent upward tilt of the paraboloids of 0.1 degree, and the transmission loss for the values previously noted then becomes:

$$L_T=35.6-40\log\lambda \quad (10)$$

It will be seen from comparison of Equations 9 and 10 that the worst bending case adds a loss of 14.3 decibels for the optimum dimensions as shown in Figs. 7A, 7B, and 7C. Equations 9 and 10 are plotted in Fig. 8 as a function of frequency from 2 kmc. to 10 kmc.

While the example here shown comprises a single repeater located approximately midway between the transmitting and receiving antennae and a zero transfer angle is also involved, it is to be understood that the preceding analysis is valid for a plurality of repeaters and for transfer angles not equal to zero. It can be shown that as the repeater is moved closer to one or the other of the antennae the ratio of the transmission loss with the repeater thus off centered to that with it centered as shown in Figs. 6A and 6B is:

$$\text{Ratio}=\frac{(d_1 d_2)}{d^2}$$

where $d_1+d_2=2d$ (11)

From this it can be seen that as either $d_1$ or $d_2$ decreases there will be a gain over the centered case. If a single repeater is used, the effect of this decrease in loss is nullified by the resulting increase in loss over the longer path under anomalous propagation conditions.

Up to now we have considered the case where the repeater consists of plane reflecting mirrors, which give a uniform amplitude distribution over their radiating surface. In some cases it is possible to decrease the losses due to beam bending for a reflector of a given size by modifying the amplitude distribution of the mirror surface. Fig. 9 shows one method by which beam "broadening" may be accomplished. The plane surface of the mirror is loaded with a suitable "lossy" or resistive material having a concave surface. The effect of this loading is to change the amplitude distribution of the mirror from uniform throughout to a cosine taper. It is obvious that any desired amplitude distribution may be obtained by proper choice of loading materials and proper shaping.

In all cases, it is understood that the foregoing arrangements are simply illustrative of a few of the specific embodiments which represent applications of the principles of the present invention. Numerous other arrangements can be readily devised in accordance with these principles by those skilled in the art without departing from the spirit and scope of the invention.

What is claimed is:

A microwave radio relay transmission system having in combination, a transmitter and antenna for transmitting a microwave beam, a receiver and antenna for receiving said beam, and a repeater station between said transmitter and receiver, said repeater station comprising a first microwave reflector for receiving said beam and reflecting it, and a second microwave reflector for receiving the reflected beam from said first reflector and reflecting it in a predetermined direction to said receiving antenna, the diameter of the sending and receiving antennae, the projected width of the repeater reflectors, and the height of the repeater reflectors being such as to maximize the sum of the loss reduction factors given by $$R_S=40 \log \left[\frac{S}{\lambda}P(\theta_1)P(\theta_2)\right]$$

$$R_W=20 \log \left[\frac{W}{\lambda}M_H(\theta)\right]$$

$$R_H=20 \log \left[\frac{H}{\lambda}M_V(\theta)\right]$$

where S is the diameter of the sending and receiving antennae, W is the projected width of the repeater, where H is the height of the repeater, where $P(\theta_1)$, $P(\theta_2)$, $M_H(\theta)$, and $M_V(\theta)$ are, respectively, expressions of the radiation patterns of the sending antenna, the receiving antenna, the repeater in the horizontal plane, and the repeater in the vertical plane.

References Cited in the file of this patent

UNITED STATES PATENTS

| | | |
|---|---|---|
| 2,464,006 | Tiley | Mar. 8, 1949 |
| 2,492,358 | Clark | Dec. 27, 1949 |

FOREIGN PATENTS

| | | |
|---|---|---|
| 700,339 | Germany | Dec. 18, 1940 |
| 582,168 | Great Britain | Nov. 7, 1946 |

OTHER REFERENCES

"Indirect Microwave Relay System," by R. R. Wakeman, Tele-Tech Magazine for September 1948, pp. 42, 43 and 106.